United States Patent [19]

Hightower, Jr. et al.

[11] Patent Number: 4,756,251

[45] Date of Patent: Jul. 12, 1988

[54] SOLID ROCKET MOTOR PROPELLANTS WITH RETICULATED STRUCTURES EMBEDDED THEREIN TO PROVIDE VARIABLE BURN RATE CHARACTERISTICS

[75] Inventors: James O. Hightower, Jr.; Tomio Sato, both of Huntsville, Ala.

[73] Assignee: Morton Thiokol, Inc., Chicago, Ill.

[21] Appl. No.: 908,762

[22] Filed: Sep. 18, 1986

[51] Int. Cl.$^4$ .............................................. C06D 5/06

[52] U.S. Cl. ................................ 102/289; 102/287; 102/290; 102/291

[58] Field of Search ................ 102/287, 289, 290, 291; 264/3.1–3.6

[56] References Cited

U.S. PATENT DOCUMENTS

| | | | |
|---|---|---|---|
| 2,961,710 | 11/1960 | Stark | 18/48 |
| 2,977,885 | 4/1961 | Perry, Jr. et al. | 102/98 |
| 3,109,374 | 11/1963 | Rumbel et al. | 102/98 |
| 3,109,375 | 11/1963 | Rumbel et al. | 102/98 |
| 3,125,542 | 3/1964 | Haines | 260/2.5 |
| 3,140,663 | 7/1964 | Rumbel et al. | 102/98 |
| 3,163,113 | 12/1964 | Davis et al. | 102/289 |
| 3,165,483 | 1/1965 | Gemeinhardt et al. | 260/2.5 |
| 3,171,820 | 3/1965 | Volz | 260/2.5 |
| 3,175,025 | 3/1965 | Geen et al. | 264/80 |
| 3,175,030 | 3/1965 | Geen | 264/321 |
| 3,191,535 | 6/1965 | Mulloy | 102/291 |
| 3,230,281 | 1/1966 | Carrez | 264/3 |
| 3,308,210 | 3/1967 | Ross | 264/3 R |
| 3,367,268 | 2/1968 | Spenadel et al. | 102/289 |
| 3,389,025 | 6/1968 | Nix et al. | 149/19 |
| 3,499,283 | 3/1970 | Simpkins | 60/39.47 |
| 3,616,841 | 11/1971 | Walz | 164/34 |
| 3,664,133 | 5/1972 | Iwanciow et al. | 60/255 |
| 3,711,115 | 1/1973 | Lohr | 280/150 AB |
| 3,756,025 | 9/1973 | McCullough | 60/255 |
| 3,764,420 | 10/1973 | Sayles | 149/21 |
| 3,807,171 | 4/1974 | Anderson | 60/255 |
| 3,811,380 | 5/1974 | Glass | 102/49.7 |
| 3,822,645 | 7/1974 | Alexander | 102/102 |
| 3,827,715 | 8/1974 | Lynch | 280/150 AB |
| 3,829,537 | 8/1974 | Rosenthal | 264/3 R |
| 3,860,678 | 1/1975 | Martin et al. | 264/3 A |
| 3,897,221 | 7/1975 | Salyer et al. | 29/191.2 |
| 3,925,122 | 12/1975 | Berthmann et al. | 149/2 |
| 3,946,039 | 3/1976 | Walz | 264/332 |
| 3,954,701 | 5/1976 | Schaffling | 102/290 X |
| 3,972,545 | 8/1976 | Kirchoff et al. | 280/735 |
| 4,072,546 | 2/1978 | Winer | 102/289 X |
| 4,083,905 | 4/1978 | Insley et al. | 264/44 |
| 4,085,173 | 4/1978 | Lomax, Jr. et al. | 102/289 X |
| 4,116,466 | 9/1978 | Gehrig | 280/736 |
| 4,180,535 | 12/1979 | Rhoades | 102/291 X |
| 4,321,220 | 3/1982 | Camp | 264/3 R |
| 4,370,181 | 1/1983 | Lundstrom et al. | 149/2 |
| 4,411,199 | 10/1983 | Yates et al. | 102/291 X |
| 4,418,622 | 12/1983 | Foster et al. | 102/307 |
| 4,547,342 | 10/1985 | Adams et al. | 422/166 |
| 4,574,700 | 3/1986 | Lewis | 102/290 X |
| 4,590,860 | 5/1986 | Kromrey | 102/290 X |
| 4,601,862 | 7/1986 | Byrd et al. | 102/290 X |

FOREIGN PATENT DOCUMENTS 45-20199 7/1970 Japan.

OTHER PUBLICATIONS

Brochure, "Duocel Foam Metal, a New Basic Design Material, Passive Omnidirectional Borehold Deformation Gauge", by Energy Research and Generation, Inc.
Brochure, "ERG Evolutionary Basic Design Materials", by Energy Research and Generation, Inc.
Brochure, "Reticulated Vitreous Carbon", by Energy Research and Generation, Inc.
Brochure, "Duocel, a New Basic Design Material", by Energy Research and Generation, Inc.
Technical Report AFRPL-TR-68-232, Dec., 1968, "Foamed Aluminum Propellant Study."
Brochure, "Duocel Foam Metal, a New Basic Design Material for Energy Absorption and Structural Applications", by Energy Research and Generation, Inc.
"Scott, Chemotronics Get Reticulation Patents", C&EN, Jun. 7, 1965, p. 42.

Primary Examiner—Peter A. Nelson
Attorney, Agent, or Firm—James C. Simmons; Gerald K. White

[57] ABSTRACT

A solid propellant grain which comprises an homogeneous mass of propellant material including an oxidant. A variable burn rate is provided by embedding a reticulated structure in a portion only of the propellant mass. The reticulated structure may be coated with a high thermal conductivity material to provide an increased burning rate. The coat of material is selected to preferably provide improved bonding to the propellant mass.

20 Claims, 2 Drawing Sheets

SOLID ROCKET MOTOR PROPELLANTS WITH RETICULATED STRUCTURES EMBEDDED THEREIN TO PROVIDE VARIABLE BURN RATE CHARACTERISTICS

The present invention relates to solid rocket motor propellants with reticulated structures embedded therein.

It has been suggested in U.S. Pat. No. 3,191,535 to Mulloy to prepare a solid propellant which consists essentially of a cellular fuel element having uniform interconnecting spherical voids of a metal or metal alloy, and a propellant material filling the voids.

It has also been suggested in U.S. Pat. Nos. 3,616,841 and 3,946,039 to Walz that form retaining reticulated structures of metal or the like may be used as solid propellant reinforcement and burning rate modifiers. These Walz patents, which are hereby incorporated herein by reference and made a part of this specification, describe methods for producing such a reticulated structure by using as a pattern a self-supporting reticulated polyurethane or organic foam formed of ligaments to provide a wide range of pore sizes, varying from 3 to 125 pores per linear inch, and the finished foam material is characterized as having ligaments which are continuous, gas-free or of low porosity, and of integral construction.

In order to provide variable burn rates for a solid propellant grain in a rocket motor and hence variable thrust levels, the requirement that two different propellant compositions be mixed and that one composition be cast in the rocket case before the other composition is cast is costly and time consuming. It is an object of the present invention to provide a variable burn rate solid propellant grain which requires the casting of only a single homogeneous mass of propellant material.

It is another object of the present invention to achieve a variable burn rate solid propellant grain by embedding at least one reticulated structure in a portion only of the grain.

If the reticulated structure is not adequately bonded to the propellant material in which it is embedded, void or crack burning may occur which may result in increased surface area and accordingly a greater than desired pressure. Therefore, it is still another object of the present invention to provide such a grain wherein good bonding is provided between the reticulated structure and the propellant material in which it is embedded.

It is yet another object of the present invention to vary the thermal conductivity characteristics of the reticulated structure for either faster of slower burning rate of a portion of a grain containing the reticulated structure.

It is another object of the present invention to provide a rocket motor grain having a reticulated structure embedded therein which has reduced or minimum smoke characteristics.

The above and other objects, features, and advantages of this invention will be apparent in the following detailed description of the preferred embodiments thereof which is to be read in connection with the accompanying drawings.

DETAILED DESCRIPTION OF THE PREFERRED EMBODIMENTS

Figure 1:
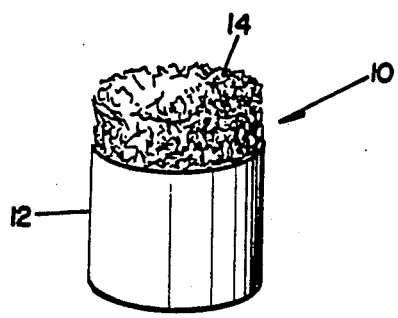
FIG. 1 is a perspective view of a propellant grain portion with a reticulated structure embedded therein but with a portion of the reticulated structure left unfilled with propellant mass to better illustrate the reticulated structure of the present invention.

Referring to FIG. 1, there is illustrated at 10 a solid propellant grain portion which includes an homogeneous mass 12 of propellant material including a suitable oxidant in which is embedded a reticulated structure 14 of combustible or non-combustible material such as, for example, aluminum, boron, magnesium, beryllium, copper, alumina, carbon, polyurethanes, graphite, and zinc. If it is not necessary that the propellant be smokeless, it is usually preferred that the reticulated structure 14 be composed of combustible material such as, for example, aluminum, boron, beryllium, or copper so that it will also burn as the homogeneous mass of propellant burns to provide increased energy. However, if it is desired that the propellant be smokeless, it is preferred that the reticulated structure 14 be composed of carbon, graphite, or a non-combustible material such as, for example, boron/nitride, silicon carbide, alumina, or a high melting point metal such as titanium or a zirconium-titanium alloy. Although carbon and graphite may be combustible under some conditions such as if the propellant mass is oxygen rich, carbon and graphite produce non-smoke producing carbon dioxide when they burn. For the purposes of this specification and the claims, the term "homogeneous mass of propellant material" refers to a propellant material of uniform structure or composition and is meant to include propellant mixtures commonly known as composite propellants as well as homogeneous propellant compounds commonly known as homogeneous propellants. A portion of the grain 10 has been left unfilled with propellant material in order to better illustrate the reticulated structure 14 which is an isotropic structure similar to the structures described in the Walz patents previously referred to. Such a structure is composed of a multitude of ligaments which are of generally uniform dimension and interconnected with each other to form voids which are open to each other so that they may be filled with propellant or other material. For the purposes of this specification and the claims, the term "reticulated structure" is meant to refer to a structure which is composed of a multitude of ligaments interconnected with each other to form voids which are open to each other and includes such a structure as described in the Walz patents.

Figure 2:
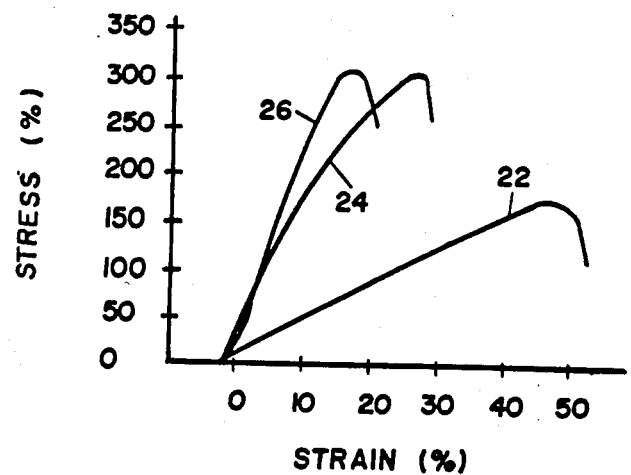
FIG. 2 is a stress-strain diagram for propellants reinforced with reticulated structures and one which is unreinforced.

FIG. 2 shows a stress-strain diagram for an unreinforced propellant at 22 and the propellant reinforced with 10 pores per linear inch and 20 pores per linear inch respectively reticulated aluminum similar to that described in the aforesaid patents to Walz at 24 and 26 respectively. The propellant in FIG. 2 is composed of the following by weight percent:

| | |
|---|---|
| Hydroxy terminated Polybutadiene (binder) | 9.990 |
| Catocene (burning rate catalyst) | 4.000 |
| Aluminum powder (fuel) | 18.000 |
| Ammonium perchlorate (oxidizer) | 68.000 |
| Triphenyl bismuth (cure catalyst) | 0.010 |

The reinforced grains 24 and 26 were composed of the aforementioned propellant with a portion of the aluminum powder replaced by reticulated aluminum so that the reinforced grains contained 13.491 percent aluminum powder and 4.509 percent reticulated aluminum. The tests resulting in the stress-strain diagram were conducted at a temperature of 77° F., a cross head speed of 2 inch/minute, and a specimen gage length of 1.25 inch. FIG. 2 shows the ability of the reinforced propellant to withstand greater stresses at respectively lesser strains, and also shows the capability of the reinforced propellant to be strained by more than about 15% before reaching its yield point. Thus, it has been discovered and FIG. 2 shows that when the reticulated or foamed aluminum is embedded in a propellant grain, the grain is capable of withstanding greater stress, i.e., almost twice as much stress as can normally be withstood by the grain when unreinforced. The ability of propellant grains to withstand high accelerations is related to the modulus of elasticity thereof, i.e., the greater the modulus of elasticity, the better a propellant grain is able to withstand high accelerations. As FIG. 2 also indicates, the modulus of elasticity of a propellant grain as well as the stress it can withstand may be increased greatly by embedding therein a reticulated structure. Such an increase in modulus of elasticity may be on the order of 4 times or more.

Figure 3:
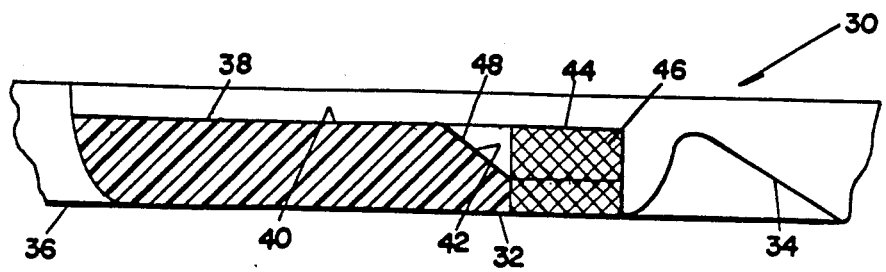
FIG. 3 is a schematic half-sectional view of an axially perforated grain embodying the present invention, the other half being substantially the same as that shown.

Referring to FIG. 3, there is provided a rocket motor generally illustrated at 30 which includes a case 32, a nozzle 34, and a head 36 as found in conventional rocket motors. The rocket motor grain 38 includes a perforation 40 over its axial length to provide burning surface and a series of slots 42 circumferentially thereof over a portion of the axial length for selectively increased surface area. For example, the perforation 40 may be cruciform-shaped, internal star-shaped, may be multi-perforated, or may have any other suitable shape.

For various rocket motor and rocket assisted projectile applications it may be desirable that the burn rate be variable over the trajectory thereof. For example, if may be desirable to provide a high burn rate initially followed by a lower burn rate, i.e., a boost-sustain thrust trace. In order to eliminate the heretofore costly and time consuming requirement of mixing and casting two different propellants in a rocket motor case in order to achieve a variable burn rate, there is provided, in accordance with the present invention, at least one portion of propellant material in which a reticulated structure is embedded to provide a greater burn rate, and there is provided at least one portion of the same propellant material in which a reticulated structure is not embedded to provide a lesser burn rate.

Referring again to FIG. 3, a high burn rate portion 44, that is, a grain portion having a reticulated structure 46 embedded therein is positioned next to the nozzle 34 with a lower burn rate portion 48, that is, a grain portion without a reticulated structure embedded therein, extending therefrom to the head 36 to provide an initial high acceleration followed by a sustainment of the achieved velocity over a longer time, i.e., a boost-sustain thrust trace. During propulsion of the rocket 30, both the reinforced and unreinforced grain portions 44 and 48 respectively will burn during the boost phase but the reinforced portion 44 will burn at a greater rate to provide high acceleration. After the reinforced portion 44 has completed burning, the slower burning unreinforced portion 48 will continue to burn to sustain the achieved velocity.

It is also desirable that a higher burn rate grain portion be positioned at the nozzle end of the rocket in order to prevent otherwise erosive burning on the interface of a lower burn rate portion that would occur if the lower burn rate portion were positioned next to the nozzle since the erosion causing propulsion gases are directed in a direction toward the nozzle. On the other hand, it may be desirable to position a higher burn rate grain portion closer to the head in order to provide appropriate modification of the center of gravity during a burn.

Figure 4:
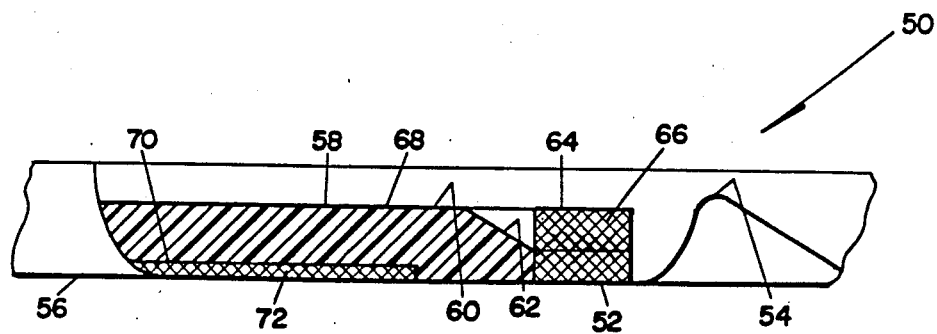
FIG. 4 is a view similar to that of FIG. 3 of an alternative embodiment of the present invention.

It should also be understood that, in accordance with the present invention, there may be provided more than one low burn rate propellant portion and more than one high burn rate propellant portion. Referring to FIG. 4, there is shown a rocket motor 50 including a case 52, a nozzle 54, and a head 56 similar to the corresponding elements 32, 34, and 36 of the rocket motor 30 of FIG. 3. The grain 58 thereof includes a perforation 60 and slots 62 similar to the perforation 40 and slots 42 of FIG. 3. In accordance with this alternative embodiment of the invention, a grain portion 64 reinforced with a reticulated structure 66 for high burn rate is provided adjacent the nozzle 54, an unreinforced grain portion 68 is disposed between the reinforced portion 64 and the head 56, and a grain portion 70 reinforced with another reticulated structure 72 is provided radially outwardly of the lower burn rate unreinforced grain portion 68 and adjacent the head 56 such that the reinforced high burn rate portion 70 surrounds the unreinforced grain portion 68 so as to provide an initial high acceleration, followed by a sustainment of the velocity over a longer time, followed by a final high acceleration which may be desired when the rocket has locked onto a target, i.e., a boost-sustain-boost thrust trace.

A high burn rate reinforced grain portion may be positioned, in accordance with the present invention, radially outwardly of a lower burn rate unreinforced grain portion in order to postpone rapid acceleration, when a rocket is launched from a canister, until the rocket has achieved some distance from friendly troops to prevent high speed debris from causing injury thereto or damage to their base. Also in accordance with the present invention, a high burn rate reinforced grain portion may be positioned radially inwardly of a lower burn rate unreinforced grain portion in order to provide high initial acceleration.

Figure 5:
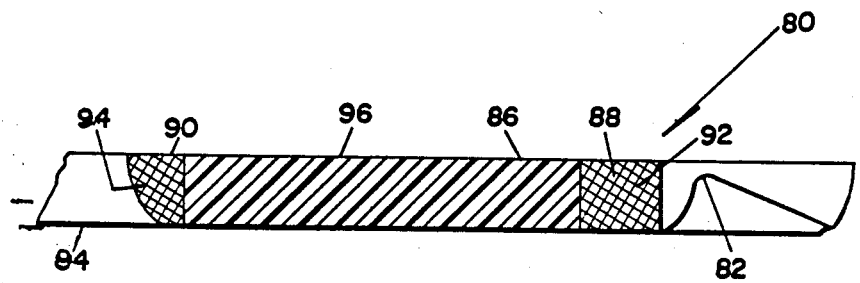
FIG. 5 is a view similar to that of FIG. 3 of an end burner grain embodying the present invention.

Referring to FIG. 5, there is shown a rocket motor 80 commonly known as an end burner. Unlike the rockets of FIGS. 3 and 4, an end burner 80 does not have a perforation extending axially thereof. Therefore, burning of the grain 86 begins at the nozzle 82 and progresses to the head 84. In order to provide an initial high acceleration followed by a sustainment of the velocity achieved over a longer time followed by a final high acceleration, high burn rate portions 88 and 90 reinforced with reticulated structures 92 and 94 respectively are provided at respectively opposite ends axially of the grain 86 and are separated by a lower burn rate unreinforced grain portion 96.

Figure 6:
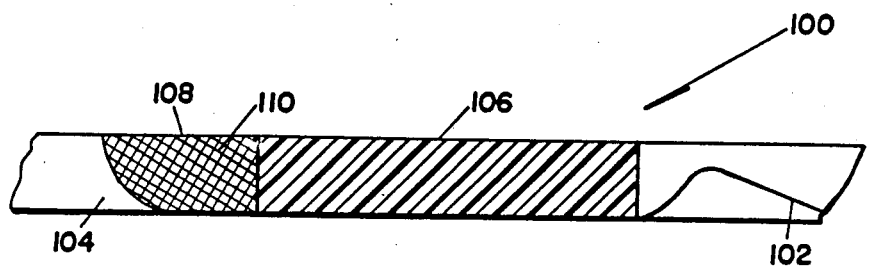
FIG. 6 is a view similar to that of FIG. 3 of another end burner grain in accordance with another embodiment of the present invention.

FIG. 6 illustrates another end burner 100 including a nozzle 102 and head 104 similar to the nozzle 82 and head 84 of FIG. 5 wherein an unreinforced grain portion 106 is disposed adjacent the nozzle 102 and a grain portion 108 reinforced with a reticulated structure 110 is disposed adjacent the head 104 in order to provide rapid acceleration near the end of the trajectory.

It should be understood that the present invention is not limited to those grain configurations illustrated in FIGS. 3, 4, 5, and 6, and that any grain configuration wherein a reticulated structure is contained in a portion only of the grain is meant to come within the scope of the present invention.

Variable burn and strength characteristics of those grain portions containing reticulated structures may be achieved by varying the material which is used in construction of the reticulated structures and by varying the number of pores per inch and diameter of the ligaments which make up the reticulated structures in accordance with engineering principles of common knowledge to those of ordinary skill in the art to which this invention pertains.

If a reticulated structure is not adequately bonded to the propellant material of a grain, the resulting void or crack burning may result in a greater than desired pressure build-up in the case. In order to provide improved bonding of the propellant material 12 to the ligaments of the reticulated structure 14, there is provided, in accordance with the present invention, on the surfaces of the reticulated structure 14 a coat of material such as, for example, copper, lead, zinc, and magnesium which improves the wetting characteristics of the surfaces of the reticulated structure for improved bonding characteristics. Preferably, the coat of material is vapor deposited onto the reticulated structure surfaces in the thickness range of 0.5 to 1.5 mils.

For reticulated structures composed of carbon or graphite or other low thermal conductivity materials, the surfaces of the reticulated structures 14 may preferably be coated with a high thermal conductivity material, more preferably lead or copper or other material also having good bonding characteristics, to change the thermal conductivity of the propellant mass for deeper heat penetration into the grain for sub-surface heating for a faster burning rate. By "high thermal conductivity material" is meant a material having a higher thermal conductivity than that of the material of the reticulated structure.

Other thermal, melting, combustion, and structural properties of a reinforced propellant grain may be modified as desired by vapor depositing or otherwise applying coats of material onto the surfaces of a reticulated structure in accordance with principles of common knowledge to those of ordinary skill in the art to which this invention pertains.

It is to be understood that the invention is by no means limited to the specific embodiments which have been illustrated and described herein, and that various modifications thereof may indeed be made which come within the scope of the present invention as defined by the appended claims.

What is claimed is:

1. A variable burn rate solid propellant grain comprises: an homogeneous mass of propellant material including an oxidant, said propellant mass includes at least one first portion and at least one second portion; and at least one three-dimensionally reticulated structure which is embedded in said first portion only of said mass and which is distributed throughout the same volume as said first portion of said mass is distributed, said second portion of said mass being free of three-dimensionally reticulated structure whereby the first portion burns with a different burn rate than the second portion burns.

2. A solid propellant grain as claimed in claim 1 wherein said reticulated structure is composed of a material selected from the group consisting of carbon and graphite.

3. A solid propellant grain as claimed in claim 2 further comprises a coat of high thermal conductivity material applied to a plurality of surfaces of said reticulated structure.

4. A solid propellant grain as claimed in claim 3 wherein said high thermal conductivity material is selected from the group consisting of lead and copper.

5. A solid propellant grain as claimed in claim 3 wherein said coat of material is selected from the group of materials which bond better to the mass of propellant material than the material of which said reticulated structure is composed bonds to the propellant material mass.

6. A solid propellant grain as claimed in claim 1 wherein said reticulated structure is composed of a material selected from the group consisting of carbon, graphite, and a non-combustible material.

7. A solid propellant grain as claimed in claim 6 further comprises a coat of high thermal conductivity material applied to a plurality of surfaces of said reticulated structure.

8. A solid propellant grain as claimed in claim 6 further comprises a coat of material applied to a plurality of surfaces of said reticulated structure, said coat of material is selected from the group of materials which bond better to the mass of propellant material than the material of which said reticulated structure is composed bonds to the propellant material mass.

9. A solid propellant grain as claimed in claim 8 wherein said coat of material is a high thermal conductivity material.

10. A solid propellant grain as claimed in claim 1 further comprises a coat of high thermal conductivity material applied to a plurality of surfaces of said reticulated structure.

11. A solid propellant grain as claimed in claim 10 wherein said coat of material is vapor deposited on a plurality of surfaces of said reticulated structure and has a thickness of between about one-half and about one and one-half mils.

12. A solid propellant grain as claimed in claim 1 further comprises a coat of material applied to a plurality of surfaces of said reticulated structure, said coat of material is selected from the group of materials which bond better to the mass of propellant material than the material of which said reticulated structure is composed bonds to the propellant material mass.

13. A solid propellant grain as claimed in claim 1 wherein said reticulated structure is composed of an oxidizable material.

14. A solid propellant grain comprises: an homogeneous mass of propellant material including an oxidant, at least one reticulated structure embedded in said mass; and a coat of high thermal conductivity material applied to a plurality of surfaces of said reticulated structure.

15. A solid propellant grain as claimed in claim 14 wherein said coat of material is selected from the group of materials which bond better to the mass of propellant material than the material of which said reticulated structure is composed bonds to the propellant material mass.

16. A solid propellant grain as claimed in claim 14 wherein said high thermal conductivity material is selected from the group consisting of lead and copper.

17. A solid propellant grain as claimed in claim 14 wherein said coat of material is vapor deposited on a plurality of surfaces of said reticulated structure and has thickness of between about one-half and about one and one-half mils.

18. A solid propellant grain comprises an homogeneous mass of propellant material including an oxidant; at least one reticulated structure selected from the group consisting of carbon and graphite embedded in said mass; and a coat of material selected from the group consisting of lead and copper applied to a plurality of surfaces of said reticulated structure.

19. A solid propellant grain as claimed in claim 18 wherein said coat of material has a thickness within the range of about one-half to about one and one-half mils.

20. A solid propellant grain as claimed in claim 18 wherein said coat of material is vapor deposited onto said reticulated structure.

* * * * *